(12) United States Patent
Luo et al.

(10) Patent No.: US 11,813,738 B2
(45) Date of Patent: Nov. 14, 2023

(54) ROBOT WAIST SKELETON AND ROBOT

(71) Applicants: CLOUDMINDS (BEIJING) TECHNOLOGIES CO., LTD., Beijing (CN); INNFOS DRIVE (BEIJING) TECHNOLOGIES CO., LTD., Beijing (CN)

(72) Inventors: Cheng Luo, Guangxi (CN); Haotian Cui, Beijing (CN); Xunge Yan, Beijing (CN); William Xiao-Qing Huang, Beijing (CN); Yuanping Cai, Beijing (CN)

(73) Assignees: CLOUDMINDS (BEIJING) TECHNOLOGIES CO., LTD., Beijing (CN); CLOUDMINDS ROBOTICS CO. LTD., Shanghai (CN)

( * ) Notice: Subject to any disclaimer, the term of this patent is extended or adjusted under 35 U.S.C. 154(b) by 547 days.

(21) Appl. No.: 16/806,845

(22) Filed: Mar. 2, 2020

(65) Prior Publication Data

US 2020/0282573 A1   Sep. 10, 2020

(30) Foreign Application Priority Data

Mar. 1, 2019   (CN) .......................... 201910154350.6

(51) Int. Cl.
*B25J 17/00* (2006.01)
*F16C 17/26* (2006.01)
*F16C 33/06* (2006.01)

(52) U.S. Cl.
CPC .............. *B25J 17/00* (2013.01); *F16C 17/26* (2013.01); *F16C 33/06* (2013.01); *F16C 2361/00* (2013.01)

(58) Field of Classification Search
CPC ............................... B25J 17/00; B25J 9/0048
See application file for complete search history.

(56) References Cited

U.S. PATENT DOCUMENTS

| 5,394,766 | A | 3/1995 | Johnson et al. | |
| 2016/0288321 | A1* | 10/2016 | Adachi | ..................... B25J 17/00 |
| 2019/0001486 | A1* | 1/2019 | Xiong | ...................... B25J 17/00 |
| 2020/0016774 | A1* | 1/2020 | Keen | ...................... F16M 11/08 |

(Continued)

FOREIGN PATENT DOCUMENTS

| CN | 104401419 A | 3/2015 |
| CN | 105127982 A | 12/2015 |

(Continued)

OTHER PUBLICATIONS

1st Office Action dated Apr. 28, 2020 by the CN Office.

(Continued)

*Primary Examiner* — Charles A Fox
*Assistant Examiner* — Gregory T Prather

(57) ABSTRACT

A robot waist skeleton includes: a swing waist effector; a first bracket, one end of which is connected to an output end of the swing waist effector; a bend waist effector, a case of which is connected to the other end of the first bracket; a second bracket, one end of which is connected to the case of the swing waist effector; a rotate waist effector, an output end of which is connected to the other end of the second bracket; and a third bracket, one end of which is connected to a case of the swing waist effector.

12 Claims, 6 Drawing Sheets

(56) References Cited

U.S. PATENT DOCUMENTS

2020/0206958 A1\* 7/2020 Xiong ..................... B25J 17/00
2021/0308877 A1\* 10/2021 Riegger ..................... B25J 9/08

FOREIGN PATENT DOCUMENTS

| CN | 106737585 | A | 5/2017 |
| CN | 106945071 | A | 7/2017 |
| CN | 107243921 | A | 10/2017 |
| EP | 1083120 | A2 | 3/2001 |
| EP | 2676776 | A1 | 12/2013 |
| JP | H05245784 | A | 9/1993 |
| JP | 2001150371 | A | 6/2001 |
| JP | 2009011421 | A | 1/2009 |

OTHER PUBLICATIONS

1st Office Action dated Jan. 19, 2021 by the JP Office; Appln.No. 2020033602.

European search report and European search opinion dated Jul. 8, 2020; EP 20159198.9.

YouTube video: "INNFOS XR-1 Robot—the intelligent service robot powered by Innfos SCA" (Innfos Technology)—Feb. 24, 2019 XP054980621, Retrieved from the Internet on Jun. 24, 2020: URL:https://www.youtube.com/watch?v=a4i8P5O1G9k.

Proceedings of the 2014 SICE Annual Conference: "Design and implementation of 3-DOF dynamic balancing waist and its fuzzy control for adult-sized humanoid robot" (Lin Chun-Yu et al.)—Sep. 9, 2014 pp. 2133-2138, XP032668819, DOI: 10.1109/SICE.2014.6935319.

\* cited by examiner

ROBOT WAIST SKELETON AND ROBOT

CROSS-REFERENCE TO RELATED APPLICATIONS

This application claims priority to Chinese Patent Application No. 201910154350.6, filed with the Chinese Patent Office on Mar. 1, 2019, titled "ROBOT WAIST SKELETON AND ROBOT", the entire contents of which are incorporated herein by reference.

TECHNICAL FIELD

Embodiments of the present application relate to the technical field of robots, and in particular, relate to a robot waist skeleton and a robot.

BACKGROUND

At present, a variety of robots are being provided. In different fields, since different robots implement different functions, the robots are also different in terms of structure. For example, bionic robots are serving in the restaurants industry or government affairs, and the appearance of these robots is the same as the human being.

However, during implementation of the present application, the inventors have identified that in the conventional bionic robots, with respect to waist parts of the bionic robot serving as transitional parts bridging half-body parts and head parts of the robot, most of these parts are integrally designed and fail to move.

SUMMARY

An embodiment of the present application provides a robot waist skeleton. The robot waist skeleton includes: a swing waist actuator; a first bracket, one end of which is connected to an output end of the swing waist actuator; a bend waist actuator, a case of which is connected to the other end of the first bracket; a second bracket, one end of which is connected to the case of the swing waist actuator; a rotate waist actuator, an output end of which is connected to the other end of the second bracket; and a third bracket, one end of which is connected to a case of the swing waist actuator.

Another embodiment of the present application provides a robot. The robot includes a robot waist skeleton. The robot waist skeleton includes: a swing waist actuator; a first bracket, one end of which is connected to an output end of the swing waist actuator; a bend waist actuator, a case of which is connected to the other end of the first bracket; a second bracket, one end of which is connected to the case of the swing waist actuator; a rotate waist actuator, an output end of which is connected to the other end of the second bracket; and a third bracket, one end of which is connected to a case of the swing waist actuator.

BRIEF DESCRIPTION OF THE DRAWINGS

For clearer descriptions of the technical solutions according to the specific embodiments of the present application or the technical solutions in the related art, the accompanying drawings incorporated for illustrating the specific embodiments or the related art are briefly described hereinafter. In all the accompanying drawings, like elements or parts are generally denoted by like reference numerals. In the accompanying drawings, various elements or parts are not necessarily drawn according to the actual scale.

REFERENCE NUMERALS AND DENOTATIONS THEREOF

Figure 1:
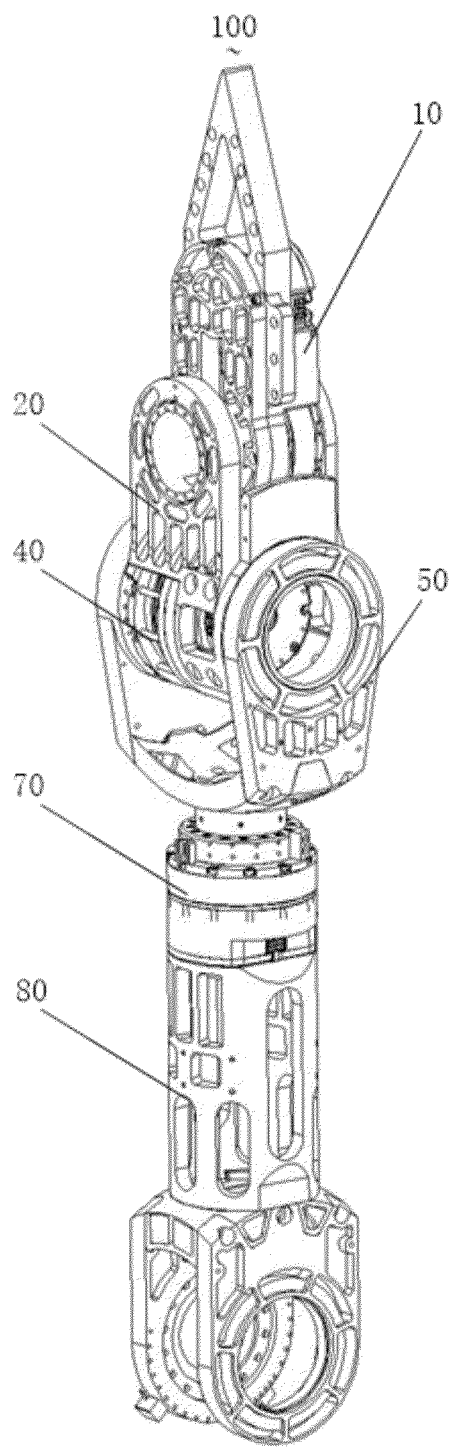
FIG. 1 is an assembling view of a robot waist skeleton according to an embodiment of the present application.

Robot waist skeleton 100;
swing waist actuator r 10;
First bracket 20;
First bearing 30;
Bend waist actuator 40;
Second bracket 50;
Second bearing 60;
Rotate waist actuator 70;
Third bracket 80;
First boss 11;
First screw hole 12;
First stand plate 21;
Second stand plate 22;
First through hole 211;
First connecting hole 212;
Second connecting hole 221;
Third connecting hole 222;
Stand plate connecting block 23;
Second screw hole 41;
Second boss 42;
First planar portion 43;
Second planar portion 44;
Third screw hole 431;
Fourth screw hole 441;
Third stand plate 51;
Fourth stand plate 52;
First connecting block 53;
Second through hole 511;
First groove 512;
Second groove 521;
Fourth connecting hole 522;
Third through hole 531;
First protrusion 532;
Second protrusion 533;
Third boss 71;
Fourth boss 72;
Stand post 81;
Second connecting block 82;
Fifth stand plate 83;
Sixth stand plate 84;
Stand post positioning protrusion 821;
Third boss 822;
Fourth protrusion 823;
Third groove 831;

Fourth groove 841.

DETAILED DESCRIPTION

The embodiments containing the technical solutions of the present application are described in detail with reference to the accompanying drawings. The embodiments hereinafter are only used to clearly describe the technical solutions of the present application. Therefore, these embodiments are only used as examples, but are not intended to limit the protection scope of the present application.

It should be noted that unless otherwise specified, the technical terms and scientific terms used in the present application shall express general meanings that may be understood by a person skilled in the art.

In the description of the present application, it should be understood that the terms "upper", "lower", "inner", "outer", "axial", "radial", and the like indicate orientations and position relationships which are based on the illustrations in the accompanying drawings, and these terms are merely for ease and brevity of the description, instead of indicating or implying that the devices or elements shall have a particular orientation and shall be structured and operated based on the particular orientation. Accordingly, these terms shall not be construed as limiting the present application.

In addition, terms of "first", "second" are only used for description, but shall not be understood as indication or implication of relative importance or implicit indication of the number of the specific technical features. In the description of the present application, the term "more" or "a plurality of" signifies at least two, unless otherwise specified.

In the description of the present application, it should be noted that unless otherwise specified and defined, the terms "mounted", "coupled", "connected" and "fixed" and derivative forms thereof shall be understood in a broad sense, which, for example, may be understood as fixed connection, detachable connection or integral connection; may be understood as mechanical connection or electrical connection, or understood as direct connection, indirect connection via an intermediate medium, or communication between the interiors of two elements or interactions between two elements. Persons of ordinary skill in the art may understand the specific meanings of the above terms in the present application according to the actual circumstances and contexts.

In the present application, unless otherwise specified or defined, by defining that a first feature is disposed "above" or "below" or "beneath" a second feature, it may be meant that the first feature is in direct contact with the second feature, or the first feature is in indirect contact with the second feature via an intermediate medium. In addition, by defining that a first feature is disposed "over" or "above" a second feature, it may be meant that the first feature is rightly over the second feature or is obliquely above the second feature, or the horizontal height of the first feature is greater than that of the second feature. In addition, by defining that a first feature is disposed "under" or "blow, or "beneath" a second feature, it may be meant that the first feature is rightly under the second feature or is obliquely below the second feature, or the horizontal height of the first feature is less than that of the second feature.

Figure 2:
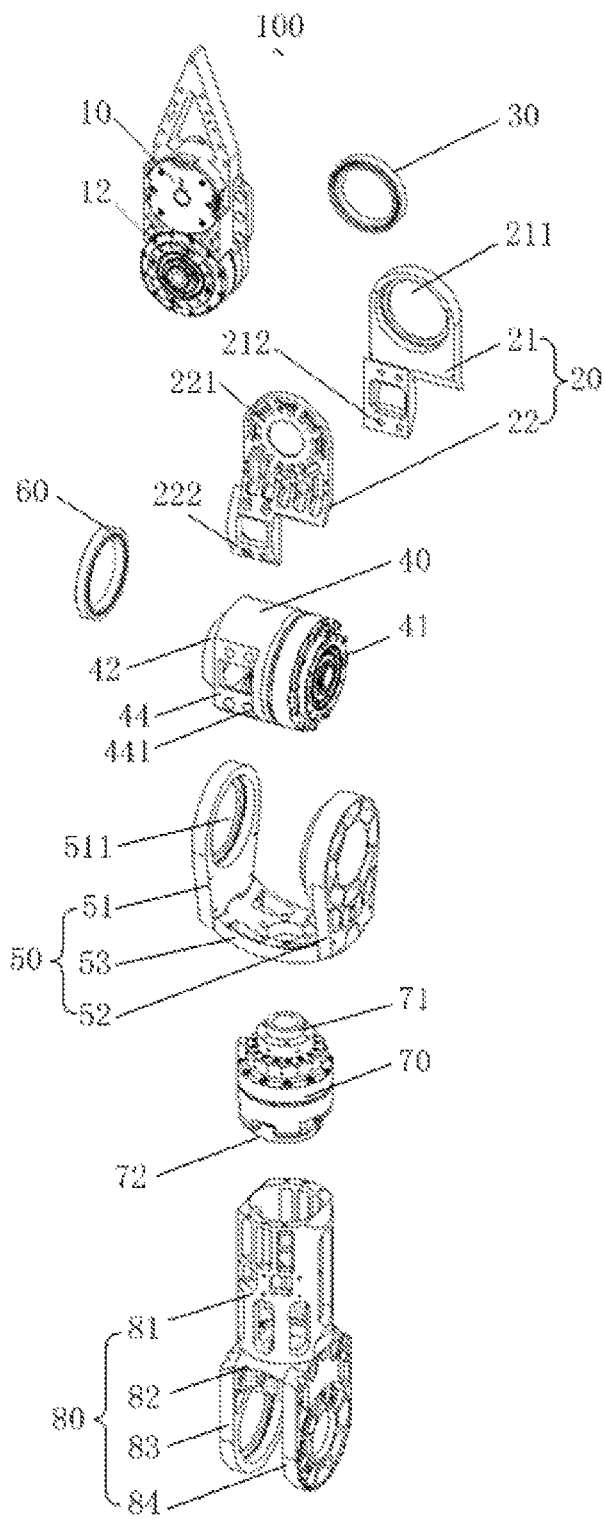
FIG. 2 is an exploded view of a robot waist skeleton according to an embodiment of the present application.

As illustrated in FIG. 1 and FIG. 2, a robot waist skeleton 100 includes a swing waist actuator 10, a first bracket 20, a first bearing 30, a bend waist actuator 40, a second bracket 50, a second bearing 60, a rotate waist actuator 70, and a third bracket 80. A case of the swing waist actuator 10 is configured to be fixed to other parts of a robot, an output end of the swing waist actuator 10 is connected to one end of the first bracket 20, the other end of the first bracket 20 is connected to a case of the bend waist actuator 40, one end of the second bracket 50 is connected to an output end of the bend waist actuator 40, the other end of the second bracket 50 is connected to an output end of the rotate waist actuator 70, and a case of the rotate waist actuator 70 is connected to the third bracket 80.

Figure 3:
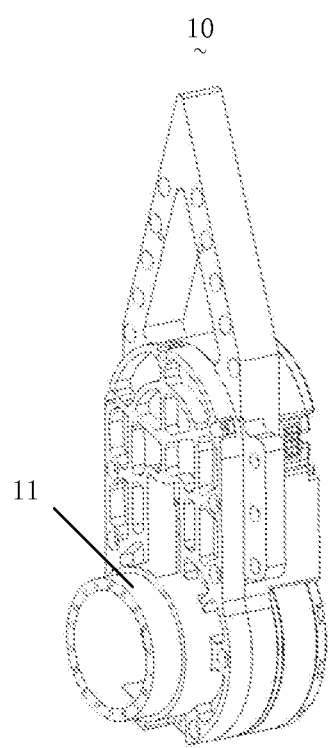
FIG. 3 is a three-dimensional view of a swing waist actuator of the robot waist skeleton according to an embodiment of the present application.

With respect to the swing waist actuator 10, as illustrated in FIG. 2 and FIG. 3, the case of the swing waist actuator 10 is provided with a first boss 11, and the output end of the swing waist actuator 10 is provided with a first screw hole 12. The first boss 11 and the first screw hole 12 of the swing waist actuator 10 are oppositely disposed.

Figure 4:
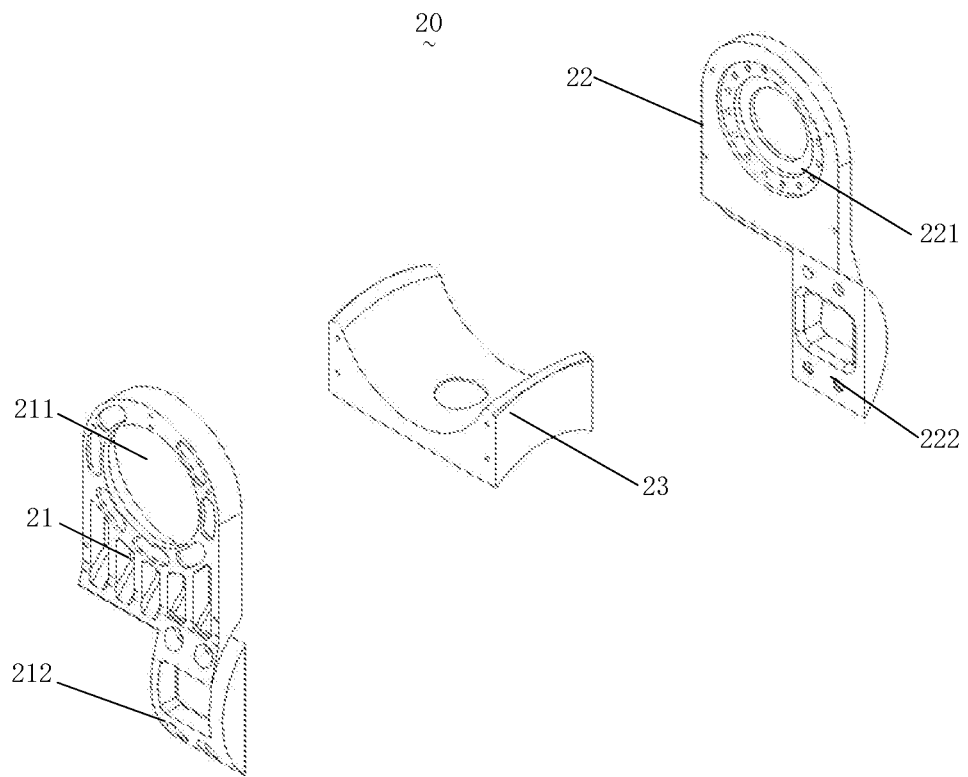
FIG. 4 is an exploded view of a first bracket of the robot waist skeleton according to an embodiment of the present application.

With respect to the first bracket 20, as illustrated in FIG. 2 and FIG. 4, the first bracket 20 includes a first stand plate 21 and a second stand plate 22. One end of the first stand plate 21 is provided with a first through hole 211, and the other end of the first stand plate 21 is provided with a first connecting hole 212. One end of the second stand plate 22 is provided with a second connecting hole 221, and the other end of the second stand plate 22 is provided with a third connecting hole 222. The first boss 11 is sleeved onto the interior of an inner ring of the first bearing 30, and an outer ring of the first bearing 30 is fixed into the first through hole 211, such that the first stand plate 21 is rotatably connected to the case of the swing waist actuator 10. A screw is threaded, via the second connecting hole 221, to the first screw hole 12, such that the end of the second stand plate 22 is connected to the output end of the swing waist actuator 10. It may be understood that the second stand plate 22 may also be connected to the swing waist actuator 10 in other modes such as snap-fitting or insertion or the like.

In some embodiments, as illustrated in FIG. 4, the first bracket 20 may be further provided with a stand plate connecting block 23. The stand plate connecting block 23 is disposed between the first stand plate 21 and the second stand plate 22, and both ends of the stand plate connecting block 23 are respectively connected to the first stand plate 21 and the second stand plate 22 in such a mode as screw threading or pin insertion. By disposing the stand plate connecting block 23 between the first stand plate 21 and the second stand plate 22, the strength of connection between the first stand plate 21 and the second stand plate 22 may be enhanced.

Figure 5:
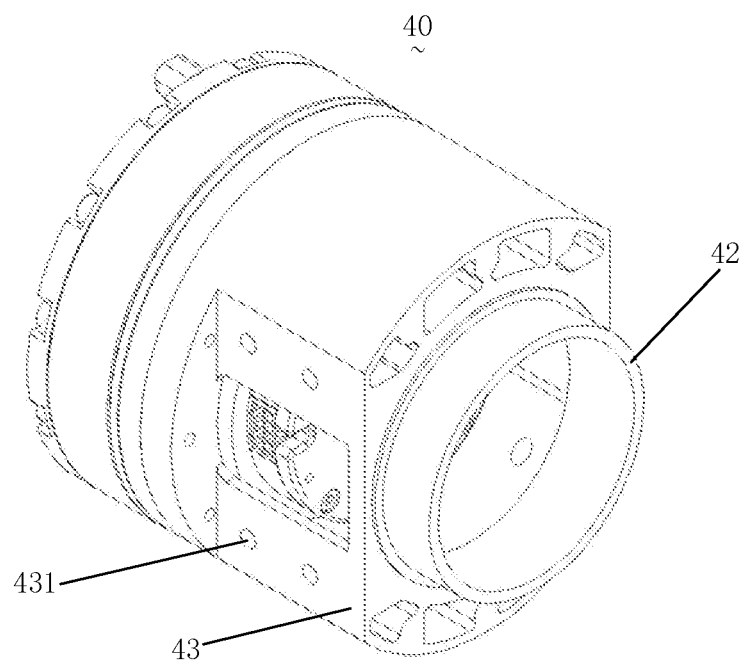
FIG. 5 is a three-dimensional view of a bend waist actuator of the robot waist skeleton according to an embodiment of the present application.

With respect to the bend waist actuator 40, as illustrated in FIG. 2 and FIG. 5, the output end of the bend waist actuator 40 is provided with a second screw hole 41, and the case of the bend waist actuator 40 is provided with a second boss 42, a first planar portion 43, and a second planar portion 44. The second boss 42 and the output end of the bend waist actuator 40 are oppositely disposed, and the first planar portion 43 and the second planar portion 44 are oppositely disposed. The first planar portion 43 is provided with a third screw hole 431, and the second planar portion 44 is provided with a fourth screw hole 441. A screw is threaded, via the first connecting hole 212, to the third screw hole 431, such that the other end of the first stand plate 21 is fixed to the first planar portion 43 of the case of the bend waist actuator 40; and another screw is threaded, via the third connecting hole 222, to the fourth screw hole 441, such that the other end of the second stand plate 22 is fixed to the second planar portion 44 of the case of the bend waist actuator 40. It may be understood that the first stand plate 21 and the second stand plate 22 may be connected to the case of the bend waist actuator 40 in other modes other than the above described mode, for example, snap-fitting, insertion, a combination of insertion and threading or the like.

When the swing waist actuator 10 operates, the case of the swing waist actuator 10 rotates relative to the first bracket 20, such that the robot waist skeleton 100 swings the waist thereof.

Figure 6:
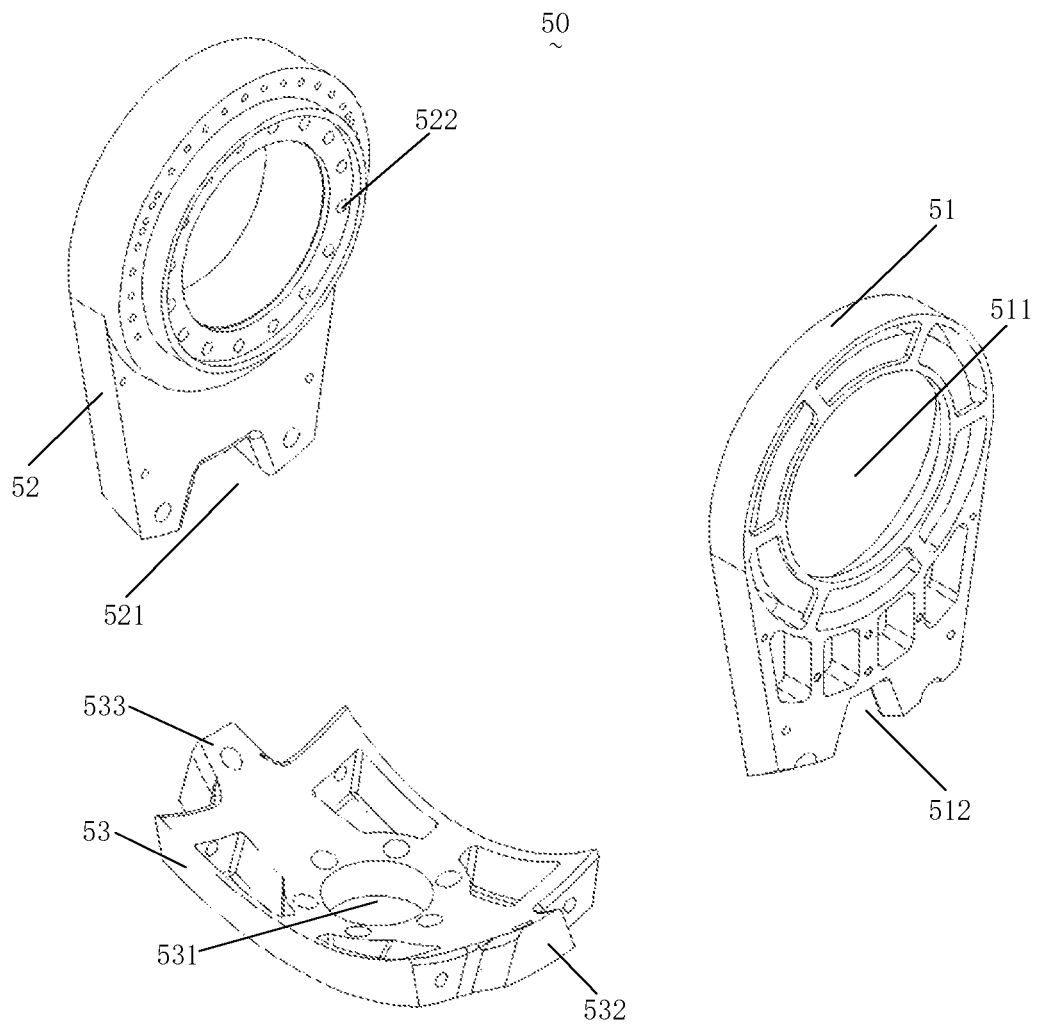
FIG. 6 is an exploded view of a second bracket of the robot waist skeleton according to an embodiment of the present application.

With respect to the second bracket 50, as illustrated in FIG. 2 and FIG. 6, the second bracket 50 includes a third stand plate 51, a fourth stand plate 52, and a first connecting block 53. One end of the third stand plate 51 is provided with a first groove 512, and the other end of the third stand plate 51 is provided with a second through hole 511. One end of the fourth stand plate 52 is provided with a second groove 521, and the other end of the fourth stand plate 52 is provided with a fourth connecting hole 522. The first connecting block 53 is provided with a third through hole 531, a first protrusion 532, and a second protrusion 533. The first protrusion 532 and the second protrusion 533 are respectively disposed on two opposite sides of the first connecting block 53. The first groove 512 and the first protrusion 532 fit to each other in a male-female engagement, and are detachably connected by threading or pin insertion or the like, such that one end of the third stand plate 51 is fixed to one side of the first connecting block 53. The second groove 521 and the second protrusion 533 fit to each other in a male-female engagement, and are detachably connected by threading or pin insertion or the like, such that one end of the fourth stand plate 52 is fixed to the other side of the first connecting block 53. In this way, the end of the third stand plate 51 and the end of the fourth stand plate 52 are respectively fixed to two opposite sides of the first connecting block 53. An outer ring of the second bearing 60 is fixed into the second through hole 511, and an inner ring of the second bearing 60 is sleeved onto the exterior of the second boss 42, such that the other end of the third stand plate 51 is rotatably connected to the case of the bend waist actuator 40. A screw is threaded, via the fourth connecting hole 522, to the second screw hole 41, such that the other end of the fourth stand plate 52 is connected to the output end of the bend waist actuator 40. Nevertheless, the fourth stand plate 52 may also be connected to the output end of the bend waist actuator 40 in other connection modes such as snap-fitting, or insertion or threading or the like, and the other end of the third stand plate 51 may also be rotatably connected to the case of the bend waist actuator 40 in other modes.

When the bend waist actuator 40 operates, the case of the bend waist actuator 40 rotates relative to the second bracket 50, such that the robot waist skeleton 100 swings the waist thereof.

With respect to the rotate waist actuator 70, the output end of the rotate waist actuator 70 is provided with a third boss 71, and the case of the rotate waist actuator 70 is provided with a fourth boss 72. The third boss 71 and the fourth boss 72 are oppositely disposed. The third boss 71 is inserted into the third through hole 531, and is fixedly connected to the first connecting block 53 in detachable connection mode such as screw threading or pin insertion or the like, such that the output end of the rotate waist actuator 70 is fixedly connected to the second bracket 50.

When the output end of the rotate waist actuator 70 drives the first connecting block 53 to rotate, the first connecting block 53 drives the second bracket 50 to rotate relative to the output end of the rotate waist actuator 70, such that the robot waist skeleton 100 rotates the waist thereof.

Figure 7:
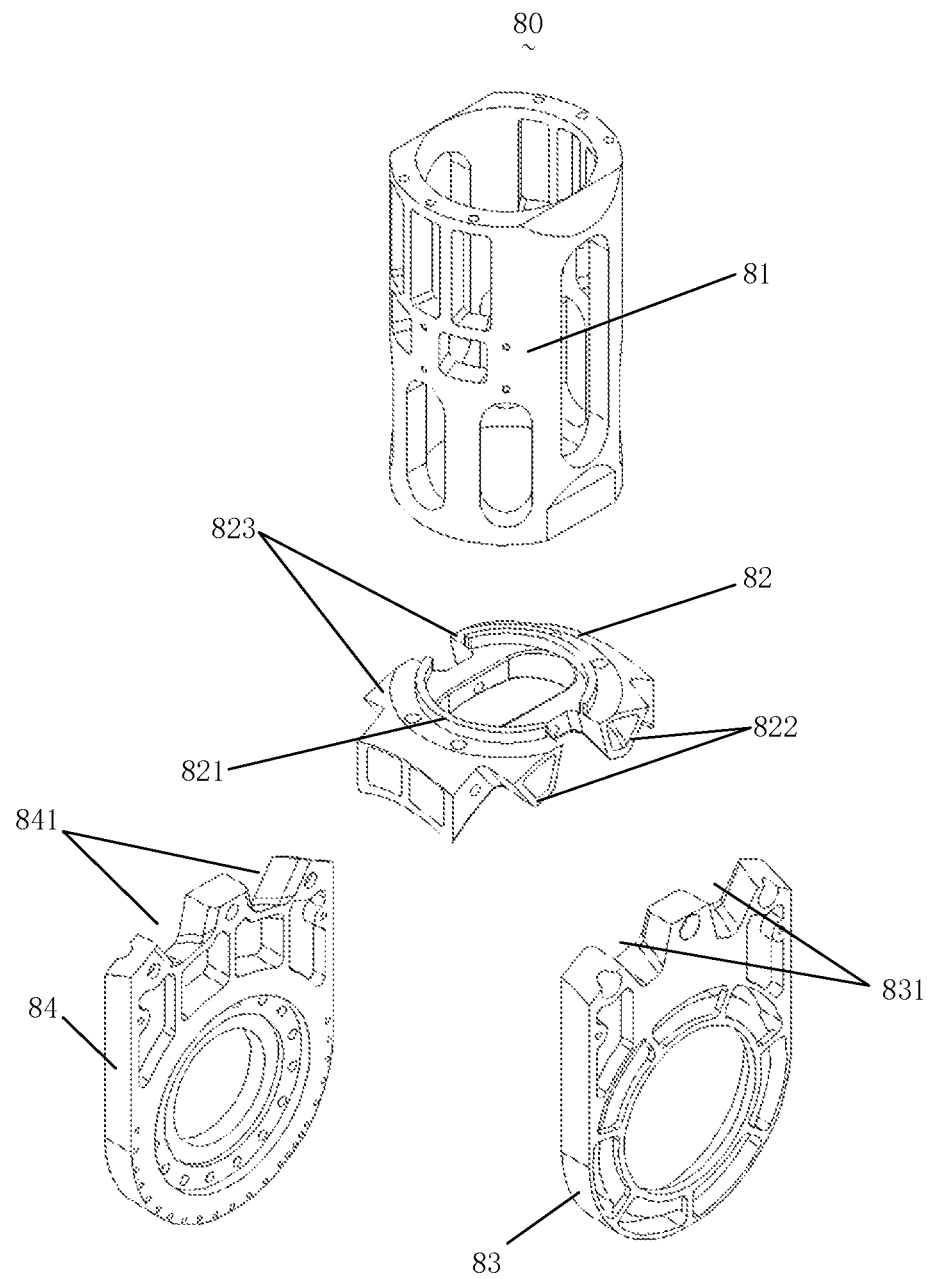
FIG. 7 is an exploded view of a third bracket of the robot waist skeleton according to an embodiment of the present application.

With respect to the third bracket 80, as illustrated in FIG. 2 and FIG. 7, the third bracket 80 includes a stand post 81, a second connecting block 82, a fifth stand plate 83, and a sixth stand plate 84. The stand post 81 is a hollow cylindrical tubular structure. The second connecting block 82 is provided with a stand post positioning protrusion 821, a third protrusion 822, and a fourth protrusion 823. The third protrusion 822 and the fourth protrusion 823 are oppositely disposed on both sides of the second connecting block 82. One end of the fifth stand plate 83 is provided with a third groove 831, and one end of the sixth stand plate 84 is provided with a fourth groove 841. One end of the stand post 81 is inserted to the fourth boss 72, and detachably connected to the fourth boss 72 by screw threading, pin insertion or snap-fitting or the like, such that the stand post 81 is fixed to the case of the rotate waist actuator 70. The other end of the stand post 81 is inserted to the stand post positioning protrusion 821, and detachably connected to the stand post positioning protrusion 821 by threading, soldering, riveting or the like, such that the second connecting block 82 is connected to the stand post 81. The third protrusion 822 and the third groove 831 fit to each other in a male-female engagement, and the fourth protrusion 823 and the fourth groove 841 fit to each other in a male-female engagement, and are detachably connected by threading, insertion or snap-fitting or the like, such that the fifth stand plate 83 and the sixth stand plate 84 are respectively fixed to two opposite sides of the second connecting block 82.

In some embodiments, the swing waist actuator 10 may be optionally a parallel actuator, wherein the parallel actuator is an actuator in which the rotation shaft of a motor and the rotation shaft of a reducer are parallelly disposed. If the rotate waist e-actuator 10 employs a parallel actuator, the space axially occupied by the swing waist actuator 10 may be reduced. The bend waist actuator 40 and the rotate waist actuator 70 are optionally coaxial actuator, wherein the coaxial actuator is an actuator in which the rotation shaft of a motor and the rotation shaft of a reducer are disposed on the same axial line. If the bend waist actuator 40 and the rotate waist actuator 70 employ coaxial actuator, the space radially occupied by the bend waist actuator 40 and the rotate waist actuator 70 may be reduced.

In the embodiments of the present application, the robot waist skeleton 100 is divided into six modules, including the swing waist actuator 10, the first bracket 20, the bend waist actuator 40, the second bracket 50, the rotate waist actuator 70, and the third bracket 80, and the six modules are directly or indirectly connected to each other in a detachable connection mode, such that modularized design of the robot waist skeleton 100 is achieved. In addition, the swing waist actuator 10 is configured to implement waist swinging movements of the robot waist skeleton 100. The bend waist actuator 40 is configured to implement waist bending movements of the robot waist skeleton 100, and the rotate waist actuator 70 is configured to implement waist rotation movements of the robot waist skeleton 100, such that three-DOF movements of waist swinging, waist bending and waist rotation of the robot waist skeleton 100 are implemented.

Another embodiment of the present application provides a robot. The robot includes a robot waist skeleton 100. The structure and functionality of the robot waist skeleton 100 are the same as those of the robot waist skeleton 100 as described in the above embodiments, which are not described herein any further.

It should be finally noted that the above-described embodiments are merely for illustration of the present application, but are not intended to limit the present application. Although the present application is described in detail with reference to these embodiments, a person skilled in the art may also make various modifications to the technical solutions disclosed in the embodiments, or make equivalent replacements to a part of or all technical features contained therein. Such modifications or replacement, made without departing from the principles of the present application, shall fall within the scope defined by the claims and the specification of the present application. Especially, various technical features mentioned in various embodiments may be combined in any mode as long as there is no structural conflict. The present application is not limited to the specific embodiments described herein in this specification, but also includes all the technical solutions falling within the scope subject to the appended claim

What is claimed is:

1. A robot waist skeleton, being configured to implement three-DOF movements of robot waist, comprising:
   a swing waist actuator;
   a first bracket, one end of which is connected to an output end of the swing waist actuator;
   a bend waist actuator, a case of which is connected to the other end of the first bracket;
   a second bracket, one end of which is connected to the output end of the bend waist actuator;
   a rotate waist actuator, an output end of which is connected to the other end of the second bracket; and
   a third bracket, one end of which is connected to a case of the rotate waist actuator;
   the first bracket comprises: a first stand plate and a second stand plate; wherein
   one end of the first stand plate is rotatably connected to a case of the swing waist actuator, and the other end of the first stand plate is directly fixed to the case of the bend waist actuator; and
   one end of the second stand plate is directly fixed to the output end of the swing waist actuator, and the other end of the second stand plate is directly fixed to the case of the bend waist actuator;
   the second bracket comprises: a first connecting block, a third stand plate, and a fourth stand plate; wherein
   one end of the third stand plate and one end of the fourth stand plate are respectively fixed to two opposite sides of the first connecting block, the other end of the third stand plate is rotatably connected to the case of the bend waist actuator, the other end of the fourth stand plate is directly fixed to an output end of the bend waist actuator, and the first connecting block is connected to the output end of the rotate waist actuator; wherein
   the swing waist actuator comprises a motor having a rotation shaft and a reducer having a rotation shaft which are parallel,
   wherein the bend waist actuator comprises a motor having a rotation shaft and a reducer having a rotation shaft which are coaxial, and
   wherein the rotate waist actuator comprises a motor having a rotation shaft and a reducer having a rotation shaft which are coaxial.

2. The robot waist skeleton according to claim 1, wherein the robot waist skeleton comprises a first bearing;
   the case of the swing waist actuator is provided with a first boss, the first boss and the output end of the swing waist actuator being oppositely disposed; and
   one end of the first stand plate is provided with a first through hole, the first bearing being fixed into the first through hole, and the first boss being sleeved onto the interior of the first bearing.

3. The robot waist skeleton according to claim 1, wherein the case of the bend waist actuator is provided with a first planar portion and a second planar portion, the first planar portion and the second planar portion being oppositely disposed, the other end of the first stand plate being fixed to the first planar portion, and the other end of the second stand plate being fixed to the second planar portion.

4. The robot waist skeleton according to claim 1, wherein the robot waist skeleton comprises a second bearing;
   the case of the bend waist actuator is provided with a second boss, the second boss and the output end of the bend waist actuator being oppositely disposed; and
   the other end of the third stand plate is provided with a second through hole, the second bearing being fixed into the second through hole, and the second boss being sleeved onto the interior of the second bearing.

5. The robot waist skeleton according to claim 1, wherein the first connecting block is provided with a third through hole, and the output end of the rotate waist actuator is provided with a third boss, the third boss being inserted into the third through hole, and the third boss being fixed to the first connecting block.

6. The robot waist skeleton according to claim 1, wherein the third bracket comprises a stand post, the stand post being a hollow tubular structure; and
   the case of the rotate waist actuator is provided with a fourth boss, the fourth boss is inserted into one end of the stand post, and the fourth boss being fixed to the stand post.

7. A robot, comprising a robot waist skeleton, wherein the robot waist skeleton is configured to implement three-DOF movements of robot waist, comprising:
   a swing waist actuator;
   a first bracket, one end of which is connected to an output end of the swing waist actuator;
   a bend waist actuator, a case of which is connected to the other end of the first bracket;
   a second bracket, one end of which is connected to the output end of the bend waist actuator;
   a rotate waist actuator, an output end of which is connected to the other end of the second bracket; and
   a third bracket, one end of which is connected to a case of the rotate waist actuator;
   the first bracket comprises: a first stand plate and a second stand plate; wherein
   one end of the first stand plate is rotatably connected to a case of the swing waist actuator, and the other end of the first stand plate is directly fixed to the case of the bend waist actuator; and
   one end of the second stand plate is directly fixed to the output end of the swing waist actuator, and the other end of the second stand plate is directly fixed to the case of the bend waist actuator;
   the second bracket comprises: a first connecting block, a third stand plate, and a fourth stand plate; wherein
   one end of the third stand plate and one end of the fourth stand plate are respectively fixed to two opposite sides of the first connecting block, the other end of the third stand plate is rotatably connected to the case of the bend waist actuator, the other end of the fourth stand plate is directly fixed to an output end of the bend waist actuator, and the first connecting block is connected to the output end of the rotate waist actuator; wherein
   the swing waist actuator comprises a motor having a rotation shaft and a reducer having a rotation shaft which are parallel,
   wherein the bend waist actuator comprises a motor having a rotation shaft and a reducer having a rotation shaft which are coaxial, and wherein the rotate waist actuator comprises a motor having a rotation shaft and a reducer having a rotation shaft which are coaxial.

8. The robot according to claim 7, wherein
the robot waist skeleton comprises a first bearing;
the case of the swing waist actuator is provided with a first boss, the first boss and the output end of the swing waist actuator being oppositely disposed; and
one end of the first stand plate is provided with a first through hole, the first bearing being fixed into the first through hole, and the first boss being sleeved onto the interior of the first bearing.

9. The robot according to claim 7, wherein
the case of the bend waist actuator is provided with a first planar portion and a second planar portion, the first planar portion and the second planar portion being oppositely disposed, the other end of the first stand plate being fixed to the first planar portion, and the other end of the second stand plate being fixed to the second planar portion.

10. The robot according to claim 7, wherein
the robot waist skeleton comprises a second bearing; the case of the bend waist actuator is provided with a second boss, the second boss and the output end of the bend waist actuator being oppositely disposed; and
the other end of the third stand plate is provided with a second through hole, the second bearing being fixed into the second through hole, and the second boss being sleeved onto the interior of the second bearing.

11. The robot according to claim 7, wherein
the first connecting block is provided with a third through hole, and the output end of the rotate waist actuator is provided with a third boss, the third boss being inserted into the third through hole, and the third boss being fixed to the first connecting block.

12. The robot according to claim 7, wherein
the third bracket comprises a stand post, the stand post being a hollow tubular structure; and
the case of the rotate waist actuator is provided with a fourth boss, the fourth boss is inserted into one end of the stand post, and the fourth boss being fixed to the stand post.

* * * * *